Oct. 3, 1933.    C. HAGEN    1,928,891
CONTINUOUS CONVERSION OF STARCH
Filed May 3, 1928
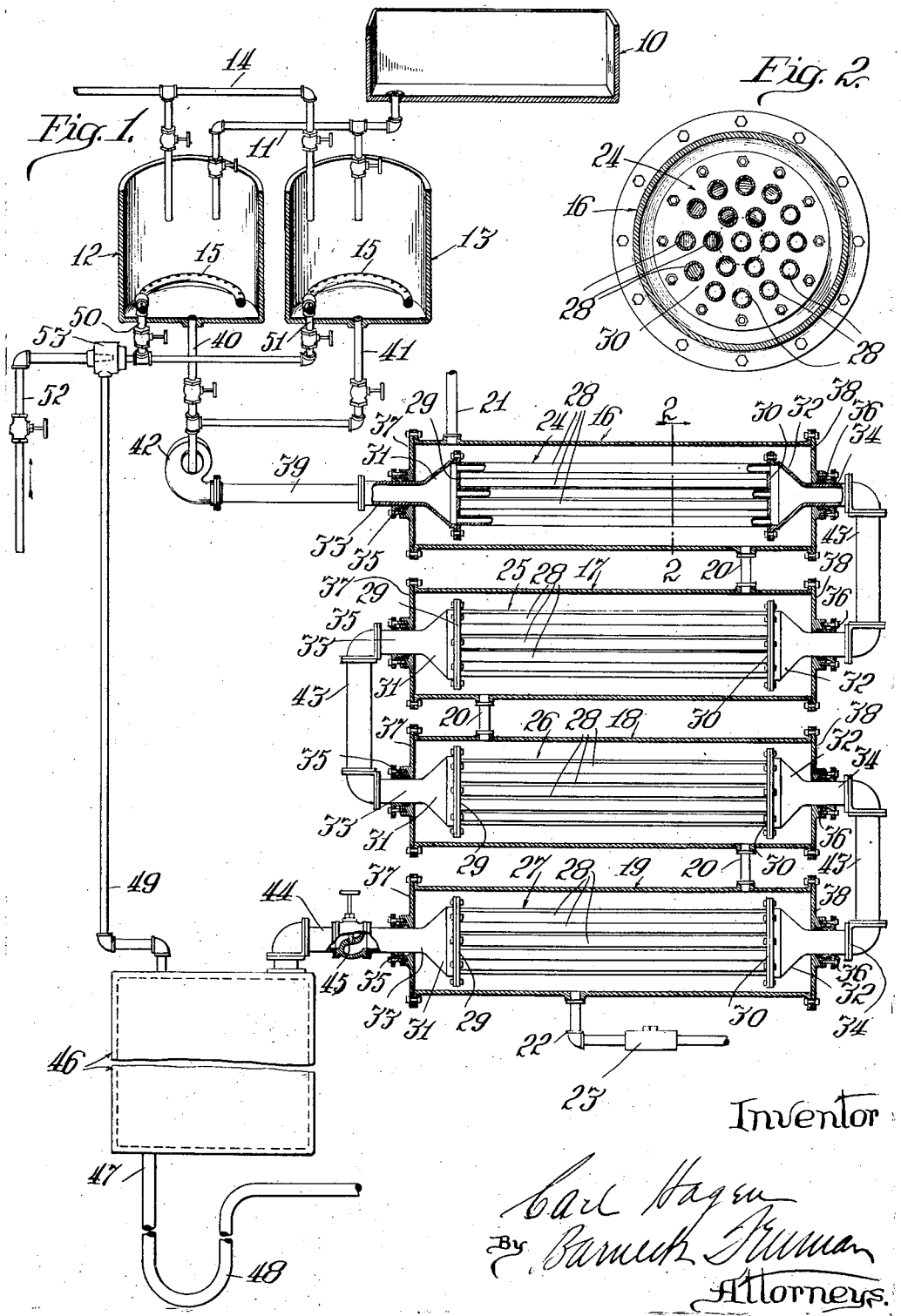

Patented Oct. 3, 1933

1,928,891

UNITED STATES PATENT OFFICE 1,928,891

CONTINUOUS CONVERSION OF STARCH

Carl Hagen, Chicago, Ill., assignor to International Patents Development Company, Wilmington, Del., a corporation of Delaware Application May 3, 1928. Serial No. 274,840

1 Claim. (Cl. 127—38)

This invention relates to the conversion of starch by acid hydrolysis in the manufacture of starch syrup (glucose) or solid grape sugar, such as cerelose, Argo sugar, 70 and 80 sugars, so called, or other like products; and the primary object of the invention is to provide a novel and improved method of converting starch continuously, instead of in batches, as has been customary, for the purpose of (1) saving steam, (2) insuring a more uniform conversion of the starch, (3) increasing the purity (dextrose content) of the converted liquor, where high purity is desirable, as in the manufacture of solid sugars, (4) facilitating the control of the process, necessary, particularly, in the manufacture of glucose, the dextrose content of which has been standardized as to amount, and (5) decreasing the cost of the apparatus which with the batch system of conversion has been high.

Efforts have been made heretofore to convert starch by continuous processes, but for one reason or another, these efforts have not been successful, despite the manifest advantages which conversion of the starch magma in a flowing stream has over the treatment of the liquor in separate batches; and it has been the general practice (probably the universal practice) up to the present time to convert starch both for glucose (starch syrup) and solid sugars by the batch method.

According to the present invention the starch and water magma, after having been acidulated with hydrochloric acid, or other acid suitable as a catalyzer, and gelatinized or pasted by application of heat, is forced through a tube or other conduit of considerable length and relatively small diameter (or where considerable volumes of the liquor are handled in parallel streams through a plurality of such conduits), which conduit or conduits extend through a body of steam maintained preferably at high pressures, in comparison with the pressures employed in batch conversion. These pressures are varied in accordance with the dextrose content required in the converted liquor and also in accordance with the dimensions of the conduit, and the velocity of movement of the liquor therethrough, that is to say in accordance with the duration of the conversion process. As the starch liquor in the tube heats up, its pressure will tend to equal the external steam pressure and this developed pressure is maintained by a valve at the outlet of the system. The starch liquor must therefore be introduced under pressure, of a pump for example, sufficient to overcome the pressure developed by heating the stream of liquid flowing through the converting conduit, and to overcome, also, the friction against the surface of the conduit so that the liquor will be caused to pass through the converting apparatus at the desired velocity. The converted liquor issuing from the converter is discharged into a closed receiving vessel in which the pressure is considerably less than that of the liquid in the converter tube or tubes, but high enough so that the steam released from the liquid, which steam is used for the pasting or gelatinizing operation previously referred to, will be at sufficient pressure to insure its penetrating the starch and water mixture in the gelatinizing vessel and effecting a proper pasting or gelatinization of the starch before it enters the converter; or the released steam may be reinforced by live steam from an outside source. For glucose (using the term in the commercial sense of a starch syrup having a reducing sugar content calculated as dextrose of 40% to 42%, which is standard), it is preferable to employ steam pressures between 60 and 80 pounds per square inch, assuming an apparatus as hereinafter described. For solid grape sugars pressures up to 100 pounds per square inch may be used, since in such case the effort is usually to convert the starch as completely as possible. If converted liquors were to be produced having purities intermediate the glucose purity and the maximum purity obtainable, the steam pressure employed should be regulated accordingly. It may be said that if too high pressures are used for the glucose conversion, difficulties are experienced in controlling conversion as to give a dextrose content within the required limits.

The accompanying drawing shows an apparatus suitable for carrying out the process just outlined. In the drawing, Fig. 1 is a general somewhat schematic view of the apparatus with certain parts shown in section, and Fig. 2 is a cross sectional view on line 2—2 of Fig. 1 with the scale enlarged.

Referring to the drawing, 10 designates a storage vessel for a mixture of starch and water. For glucose conversion the liquor should have a concentration of about 22° to 23° Baumé. For a solid sugar conversion, the density should be about 12½° Baumé. From the storage vessel 10 the starch magma passes through a pipe 11 to one of two gelatinizing tanks 12 and 13, which are used alternately. The hydrolyzing acid diluted with water is introduced into the tanks 12, 13 by pipe 14. Each tank is provided near the bottom with a perforated steam ring 15 to which steam is supplied, as will be hereinafter described.

The converter consists of one or more vessels adapted to be supplied with steam, through which extend one or more tubes or converting conduits. There are shown four vessels 16, 17, 18 and 19, the vessels being connected by pipes 20 and vessel 16 being provided with a steam supply pipe 21 and vessel 19 with an outflow pipe 22 for water of condensation preferably provided with a steam trap 23.

In the vessels 16, 17, 18 and 19 are converter units designated 24, 25, 26 and 27, each converter unit consisting, preferably, of a plurality of tubes 28 connected at opposite ends with tube sheets 29 and 30 on header fittings 31 and 32, the latter being formed with tubular portions 33, 34 extending through stuffing boxes 35, 36 on the heads 37, 38 of the vessels 16, 17, 18, 19. Connected with the header 31 of vessel 16 is an inlet pipe 39 for the starch magma having branches 40, 41 leading from the bottoms of the gelatinizing tanks 12, 13. A pump 42, preferably a rotary pump, in order that the flow through the converter should be steady and continuous and not pulsating, is arranged in the pipe 39. The converter unit 24 is connected with the converter unit 25 by a return bend pipe connection 43. Units 25 and 26 and units 26 and 27 are connected in a similar way. The header 31 of the last converter unit 27 is connected to a discharge pipe 44 provided with an adjustable valve, preferably a needle valve 45, and this pipe leads to an expansion vessel 46 provided at the bottom with a discharge pipe 47 formed with a U-bend 48 of sufficient length to maintain the desired steam pressure in the expansion vessel. Other sealing means might be employed in connection with the outlet pipe 47. 49 is a pipe leading from the expansion vessel 46 with branches 50, 51 to the steam rings 15 in the gelatinizing tanks 12, 13. Preferably live steam is introduced into pipe 49 from a steam supply pipe 52, an injector 53 being interposed between the pipes.

The parts of the converter units 24, 25, 26, 27 may be made of copper or bronze as has been customary in the case of the converters used for batch conversions. The sliding connections between the tubular portions 33, 34 of the headers 31, 32 accommodate the structure to the inequality of expansion and contraction as between the converter units and their inclosing vessels which latter will ordinarily be made of steel. However, with this type of converter it is practical to make the converter units of glass or glass enameled lined metal so that the walls of the converter with which the starch magma undergoing conversion comes into contact will be inert, catalytically, with respect to the reactions taking place during conversion. The tubes 28 may be made of heat-resisting glass and the headers 31, 32, if composed of metal, may be covered on their inner surfaces with enamel or like substance. The tubes in fact might also be made of metal with enamel linings.

In an operative apparatus the tubes 28 may be 15 feet in length and have an internal diameter of three quarters of an inch. This means that the starch magma undergoing conversion will pass through conduits, surrounded by steam, having an aggregate length of sixty feet.

The operation of the apparatus as above described is as follows: Acidulated water is run into one of the gelatinizing tanks 12 or 13 through pipe 14 in a quantity sufficient to cover the steam ring 15. The steam is then introduced and the water heated to close to the boiling point. The starch and water mixture at the proper density for conversion is introduced gradually into the gelatinizing tank from storage vessel 10 and is pasted or gelatinized by the steam which is continuously introduced into the tank from steam ring 15. Assuming a continuous operation of the conversion process, steam pressure of from 5 to 10 pounds per square inch is maintained in the expansion tank 46. If this steam is insufficient to properly gelatinize the starch by thoroughly penetrating the starch and raising its temperature to a point above the gelatinizing temperature, additional steam may be introduced from pipe 52. Preferably the steam pressure in pipe 52 is high enough so that through the operation of injector 53 it tends to draw the steam from the expansion tank 46 and force it through the steam ring 15 into the liquid in the gelatinizing tank. The gelatinization of the starch is shown as a batch operation. When one tank has been emptied liquid is drawn from the other and the first tank is refilled and the starch and water mixture therein treated with steam as described. Preferably the gelatinizing temperature is from 180° F. to 210° F. It may be at any temperature above the gelatinizing temperature of 150° F.

The gelatinized starch is introduced under pressure of pump 42 into the first of the converting units 24. Here it is divided into a number of streams, depending upon the number of tubes 28 making up the unit. Each of these streams is of relatively small diameter and as the tube through which the stream flows is completely surrounded with steam the starch magma very soon reaches a temperature approximating the temperature of the steam in vessel 16. The starch liquor, however, will be at a somewhat lower temperature than the steam because of the specific heat of starch. The vapor pressure of the starch magma will be approximately the same as that of the steam so that the pump 42 must be capable of exerting a pressure somewhat higher than the steam pressure in the vessels, 16, 17, 18 and 19 in order to overcome friction and move the liquid through the converter with the desired velocity. The pressure of the starch liquor is preferably, in an apparatus such as that described, about ten pounds in excess of steam pressure in the inclosing vessels.

The starch streams passing through the tubes 28 of the first converter unit 24 are mingled and the liquor thoroughly mixed in passing from one unit to the next. This is one reason why it is desirable to have the converter consist of a plurality of connected units. The needle valve 45 in the discharge pipe 44 is set to control the rate of outflow dependent upon the steam pressure maintained in the inclosing vessels and the pressure exerted by pump 42.

For a glucose conversion it has been found desirable, with an apparatus having a converting tube or tubes of the length and diameter above mentioned to maintain the steam used for the conversion at pressures between 50 pounds and 80 pounds per square inch. For a steam pressure of about 50 pounds the needle valve 45 is adjusted and the pump 42 operated so as to give a flow through the apparatus of approximately 15 to 16 gallons per hour for each tube. For a steam pressure of 60 pounds the rate of flow should be from 20 to 22 gallons per hour. The rate will be increased as the steam pressure increases. For 60 pounds steam pressure the time required for any particle of starch to pass through the converter will be between four and five minutes against the usual time of 24 minutes in batch conversion. The pressure in the converter tubes will be about 10 to 12 pounds higher than the steam pressure and the temperature of the starch magma about 7° to 8° lower than the steam.

For making a converted liquor for solid grape sugar it is possible to use steam pressures up to 100 pounds per square inch. With 90 pounds of steam the needle valve adjustment and speed of the pump should be such as to give a flow of approximately 12 gallons per hour for each tube, that is a conversion time of between 7 and 8 minutes against 44 minutes in batch conversion.

The degree of acidulation and the densities of the starch magmas may be substantially the same as in batch conversion. Where hydrochloric acid is used as the hydrolyzing agent, 1.944 pounds of HCl (standard commercial concentration) is used for each 45 gallons of starch liquor, for a solid sugar conversion; and 1.432 pounds for each 45 gallons for a glucose conversion. The density of the starch magma for glucose conversion is about 23° Baumé; for solid grape sugar 12½°.

All of the above figures are approximate and are to be regarded as illustrative merely.

It will be understood, further, that the invention is not limited to the specific form of apparatus shown and described as a typical embodiment of the invention. In the conversion of starch, temperature and time and also the degree of acidulation are factors which must be varied, according to the degree of conversion, that is according to the purity or dextrose content desired in the converted liquor. Moreover, the same degree of conversion may be obtained by change in the values of the factors relative to each other. If the duration of the conversion process is increased, temperature may be decreased and the same result obtained, within certain limits at least. Conversely the duration of the converting process may be shortened, by making the converter tubes shorter, for example, or by moving the liquid through the same at higher velocity, provided the starch magma in the tubes is raised to a higher temperature. Similarly if the amount of acid is increased the time or temperature must be decreased and vice versa. Where some definite intermediate purity is desired, as in glucose manufacture, a very high temperature is likely to bring about a conversion so rapid as to be difficult to control. Even with the production of a liquor for crystallization into solid grape sugar, there are limits to the use of high temperatures, on the one hand, and to the duration of the conversion operation on the other hand, if undesirable reactions are to be avoided likely to affect the dextrose itself, for example reactions tending to condense the monosaccharides to higher sugars. However, these reactions may be prevented, to a large extent at least, by conversion in glass, as suggested above; so that by utilizing this type of converting apparatus it becomes possible to not only obtain higher purities but to shorten the conversion period and thereby increase output by increasing the steam pressures. The copper of a converter appears to act as a catalyzer promoting the condensation reaction whereby the dextrose when formed is liable to be changed into non-crystallizable sugars of higher molecular weight. The copper salts formed by the corrosive action of the hydrolyzing acid on the converter walls have the same catalytic action.

The foregoing description sets forth what is regarded as the best practice for the two types of converted liquors ordinarily produced, having in view practical manufacturing conditions as well as reasonable certainty in the production of products that will have the characteristics and qualities ordinarily desired. It is to be understood, however, that the method may be used, wherever suitable, and economical for the production of any hydrolyzed starch product without reference to the degree of hydrolization, and that specifications as to temperatures, pressures, duration of conversion, dimensions of the converter tubes and the like are given subject to considerable possible variation depending upon the product desired and the other variable conditions above set forth. The streams of the starch magma undergoing hydrolysis are preferably of relatively small diameter in proportion to their length so that the application of heat is substantially uniform throughout the liquid treated, and for economical operation, at least, the steam pressures used, and consequently the temperatures of the starch undergoing hydrolysis, should be high. The pasting or gelatinizing operation preceding conversion might be omitted although to get the best results it is desirable to gelatinize the starch before it goes to the converter, since introduction of raw starch into the converter especially when operated at high temperature is likely to bring about lumping and clogging of the tubes with consequent lack of uniformity in the product. Moreover, this feature of the process makes it possible to economically use the steam released from the magma when discharged from the converter.

I claim:

Process of conversion of starch to dextrose which consists in introducing continuously into a conduit surrounded by a body of steam at a pressure above fifty pounds per square inch and having a restricted outlet, an acidulated starch and water magma under pressure sufficient to overcome the pressure developed by the heating of the starch magma to cause said magma to flow through said conduit, discharging the converted liquor into an inclosed space at a pressure lower than the pressure in the conduit and introducing the released steam into the starch magma before it enters the converting conduit.

CARL HAGEN.